(12) United States Patent
Kim et al.

(10) Patent No.: US 8,522,399 B2
(45) Date of Patent: Sep. 3, 2013

(54) HINGE APPARATUS FOR FOLDER-TYPE PORTABLE COMMUNICATION DEVICE

(75) Inventors: Jae-Shik Kim, Gyeonggi-do (KR);
Wook-Jin Lee, Gyeonggi-do (KR);
Seung-Hyub Baek, Gyeonggi-do (KR);
Jong-Cheon Wee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 257 days.

(21) Appl. No.: 13/166,037

(22) Filed: Jun. 22, 2011

(65) Prior Publication Data

US 2012/0000035 A1   Jan. 5, 2012

(30) Foreign Application Priority Data

Jul. 1, 2010 (KR) .......................... 10-2010-0063393

(51) Int. Cl.
*E05D 7/10* (2006.01)
(52) U.S. Cl.
USPC .............................................. 16/254; 16/261
(58) Field of Classification Search
USPC .................. 16/243, 353, 254–264, 270–272, 16/380
See application file for complete search history.

(56) References Cited

U.S. PATENT DOCUMENTS

| | | | | |
|---|---|---|---|---|
| 2,546,590 A * | 3/1951 | Ferrel | | 16/302 |
| 3,375,546 A * | 4/1968 | Peterson | | 16/258 |
| 4,603,452 A * | 8/1986 | Paciorek | | 16/262 |
| 4,807,330 A * | 2/1989 | Gomes | | 16/261 |
| 5,697,124 A * | 12/1997 | Jung | | 16/341 |
| 5,796,576 A * | 8/1998 | Kim | | 16/259 |
| 5,881,150 A * | 3/1999 | Persson | | 16/257 |
| 8,272,102 B2 * | 9/2012 | Zhou et al. | | 16/307 |
| 8,359,709 B2 * | 1/2013 | Van Gennep | | 16/328 |
| 8,381,357 B2 * | 2/2013 | Zinn | | 16/380 |
| 2008/0216287 A1 * | 9/2008 | Suh | | 16/262 |
| 2011/0154611 A1 * | 6/2011 | Zhou et al. | | 16/257 |

FOREIGN PATENT DOCUMENTS

KR   2004-0038304   5/2004

* cited by examiner

*Primary Examiner* — Jeffrey O Brien
(74) *Attorney, Agent, or Firm* — Cha & Reiter, LLC.

(57) ABSTRACT

A hinge apparatus for a folder-type portable communication device, wherein a body portion and a folder portion can be coupled or separated by applying a force to a hinge cap or moving a hinge dummy laterally. The device includes a body portion and a folder portion coupled to the body portion to pivot around a hinge axis, and a center hinge arm provided in the body portion. First and second side hinge arms are provided in the folder portion, and a hinge cap is provided in the first side hinge is pushed with an external force. A hinge shaft is coupled with or separated from the first side hinge arm by retracting or protruding via pushing the hinge cap, and a hinge dummy provided in the center hinge arm is coupled with or separated from the second side hinge arm by moving laterally along the hinge axis.

9 Claims, 4 Drawing Sheets

HINGE APPARATUS FOR FOLDER-TYPE PORTABLE COMMUNICATION DEVICE

CLAIM OF PRIORITY

This application claims the benefit of priority under 35 U.S.C. §119(a) from a Korean Patent Application filed in the Korean Intellectual Property Office on Jul. 1, 2010 and assigned Serial No. 10-2010-0063393, the entire disclosure of which is hereby incorporated by reference in its entirety.

BACKGROUND OF THE INVENTION

1. Field of the Invention

The present invention relates to a hinge apparatus for a folder-type portable communication device. More particularly, the present invention relates to a hinge apparatus in a folder portion of a folder-type portable communication device.

2. Description of the Related Art

Generally, "portable communication devices" refers to devices from which wireless communication can be performed, while the devices are being carried. The portable communication devices include embodiments such as a handheld phone (HHP), a cordless telephone (CT-) 2 cellular phone, a digital phone, a personal communications systems (PCS) phone, and a personal digital assistant (PDA) and can be sorted into various types according to their shapes. For example, the wireless terminals are sorted into a bar type, a flip type, a folder type, and a sliding type according to their shapes. The above-mentioned portable terminals always include an antenna apparatus, a data input/output device, and a data transceiver. For the data input device, a keypad assembly allowing data input through a finger press task is generally used, and the use of touch displays are gaining popularity.

In a conventional folder-type portable communication device, a body portion and a folder portion are coupled by a hinge apparatus such that they can be opened at a predetermined opening/closing angle.

Various key buttons and a microphone device are mounted on the body portion of the conventional folder-type portable communication device, and a display unit and a speaker device are mounted on the folder portion. A center hinge arm is also installed in the body portion.

On a lower end portion of the folder portion are installed a pair of side hinge arms which are coupled to the center hinge arm of the body portion to rotatably couple the folder portion to the body portion. A predetermined hinge apparatus is installed on the center hinge arm.

The hinge apparatus is provided with a hinge shaft which is coupled to the folder portion and rotates.

However, the conventional folder-type portable communication device is equipped with the hinge apparatus at a side of the center hinge arm of the body portion and a hinge coupling portion at the other side of the center hinge arm, such that the hinge coupling portion is coupled to the side hinge arm disposed at a side of the folder portion and in this state, the hinge shaft of the hinge apparatus is forcedly deformed by pressurization to be coupled to the side hinge arm at the other side of the folder portion, whereby much force is required for assembly and the body portion, the folder portion, and the hinge apparatus are deformed and damaged by pressurization.

Moreover, due to coupling based on pressurization and forced deformation, in the assembly and disassembly of the portable communication device, defects in the exterior of the portable communication device may occur and assembly workability of the portable communication device may be degraded.

Therefore, there is a need for an apparatus capable of coupling and separating the body portion and the folder portion by pressurizing the hinge apparatus, without causing forced deformation and damage.

SUMMARY OF THE INVENTION

Accordingly, an aspect of the present invention is to provide a hinge apparatus for a folder-type portable communication device, in which a body portion and a folder portion can be coupled or separated by pushing a hinge cap or moving a hinge dummy to the left or right (i.e. according to a direction of lateral movement). The hinge apparatus according to the present invention advantageously prevents deformation and damage in coupling and separation in a product and thus improving assembly and disassembly of the product.

According to an exemplary aspect of the present invention, there is provided a hinge apparatus for a folder-type portable communication device including a body portion and a folder portion coupled to the body portion to pivot around a hinge axis. The hinge apparatus includes a center hinge arm provided in the body portion, first and second side hinge arms provided in the folder portion, a hinge cap slidably arranged in the first side hinge arm so as to move relative to the hinge arm upon being pushed by an external force, a hinge portion provided in the center hinge arm, the hinge portion comprising a hinge shaft which is coupled with or separated from the first side hinge arm by retracting or protruding by a push of the hinge cap (i.e. by sliding movement of the hinge cap upon receipt of an external force), a hinge dummy provided in the center hinge arm to be coupled with or separated from the second side hinge arm by moving to the left or right along the hinge axis, and a hinge bracket portion provided in the center hinge arm having a means for coupling and un coupling with the hinge dummy to allow the hinge dummy to move to the left or right (laterally) along the hinge axis.

BRIEF DESCRIPTION OF THE DRAWINGS

The above and other exemplary features and advantages of exemplary embodiments of the hinge apparatus for a folder-type portable communication device according to the present invention will become more apparent from the following detailed description taken in conjunction with the accompanying drawings, in which.

DETAILED DESCRIPTION

Figure 1:
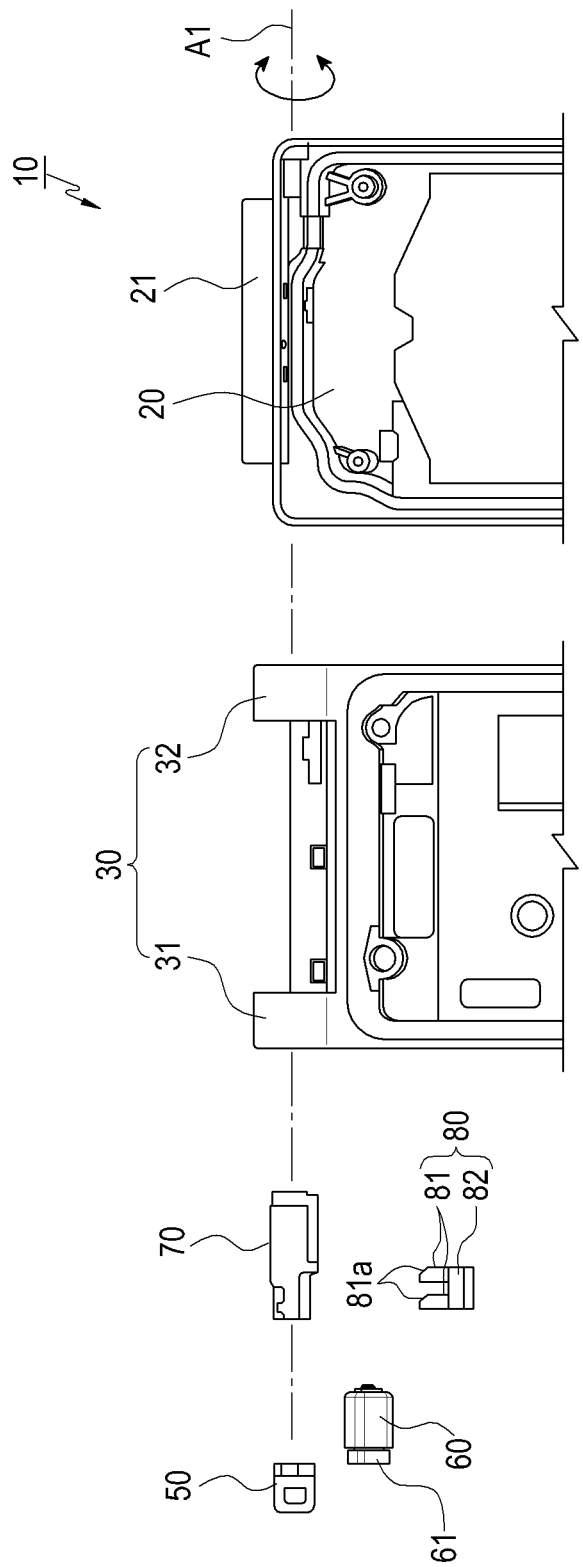
FIG. 1 is an exploded perspective view of a hinge apparatus for a folder-type portable communication device according to an exemplary embodiment of the present invention.
Figure 2:
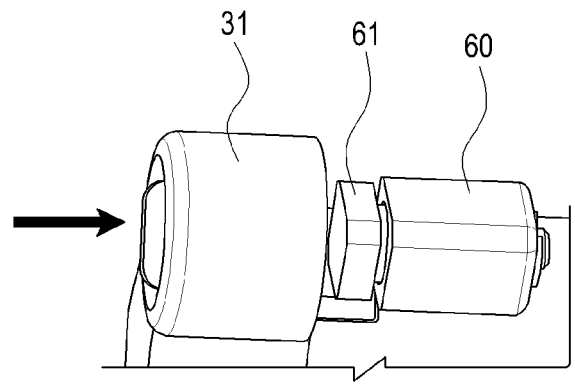
FIG. 2 is an exploded perspective view of a first side hinge arm of a hinge apparatus for a folder-type portable communication device according to an exemplary embodiment of the present invention.
Figure 3:
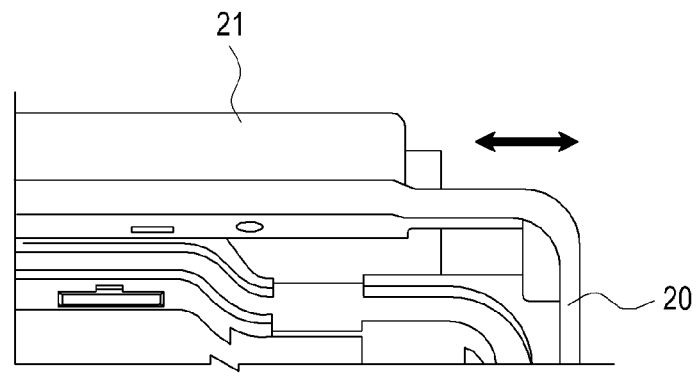
FIG. 3 is a perspective view of a center hinge arm of a hinge apparatus for a folder-type portable communication device according to an exemplary embodiment of the present invention.
Figure 4:
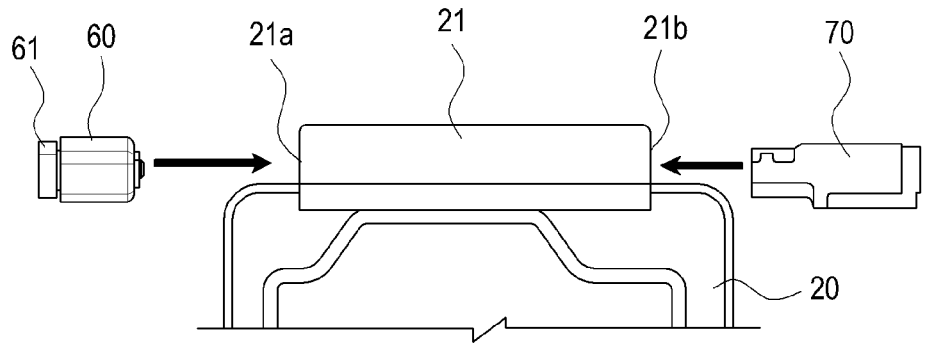
FIG. 4 is an exploded perspective view showing a before-coupling state of a hinge apparatus for a folder-type portable communication device according to an exemplary embodiment of the present invention.

Hereinafter, an exemplary embodiment of the present invention will be described in detail with reference to the accompanying drawings. The embodiment disclosed in the specification and structures shown in the drawings are merely exemplary illustrations of the present invention, and it should be understood by an artisan that numerous variations can be substituted for the exemplary embodiment are within the spirit of the invention and the scope of the appended claims.

As shown in FIGS. 1 through 8, and particularly in FIG. 1 a hinge apparatus 10 for a folder-type portable communication device may preferably include a body portion 20, a folder portion 30, first and second side hinge arms 31 and 32, a hinge cap 50, a hinge portion 60, a hinge dummy 70, and a hinge bracket portion 80. Still referring to FIG. 1, the body portion 20 is provided with the hinge portion 60, such that the body portion 20 is coupled with the first and second side hinge arms 31 and 32 to pivot around a hinge axis A1. The folder portion 30 is preferably provided with the first and second side hinge arms 31 and 32, such that the folder portion 30 is coupled with the hinge portion 60 to pivot around the hinge axis A1. The hinge cap 50 is provided in the first side hinge arm 31 to be pushed by an external force, and the hinge portion 60 preferably includes a hinge shaft 61. The hinge portion 60 is preferably provided in a center hinge arm 21, such that the hinge shaft 61, when being pressed by a push of the hinge cap 50, retracts or protrudes from the center hinge arm 21 to be coupled with or separated from a coupling hole 31a formed in the first side hinge arm 31. The hinge dummy 70 is provided in the center hinge arm 21, such that the hinge dummy 70 moves to the left or right (laterally) along the hinge axis A1 to be coupled with or separated from a coupling and separating groove 32a (FIGS. 6 and 8) formed in the second side hinge arm 32. The hinge bracket portion 80 is provided in the center hinge arm 21 (FIG. 6), such that the hinge bracket portion 80 is coupled with the hinge dummy 70 and allows the hinge dummy 70 to move to the left or right (permits lateral movement).

As shown in FIGS. 1 through 3 and FIGS. 6 through 8, in the first side hinge arm 31 is formed the coupling hole 31a which is coupled with the hinge cap 50 and allows the hinge cap 50 to be pushed by an external force, and in the second side hinge arm 32 is formed the coupling and separating groove 32a to be coupled with or separated from a coupling protrusion 71 formed on the hinge dummy 70.

As shown in FIGS. 1 through 5, at a side of the center hinge arm 21 is formed a resting groove 21a (FIG. 4) for resting the hinge portion 60 therein, and at the other side of the center hinge arm 21 is formed a moving groove 21b for allowing movement of the hinge dummy 70 therethrough. Between the resting groove 21a and the moving groove 21b is formed a blocking portion 21c for blocking the body portion 20 from an external environment (e.g., a foreign substance or water).

Figure 7:
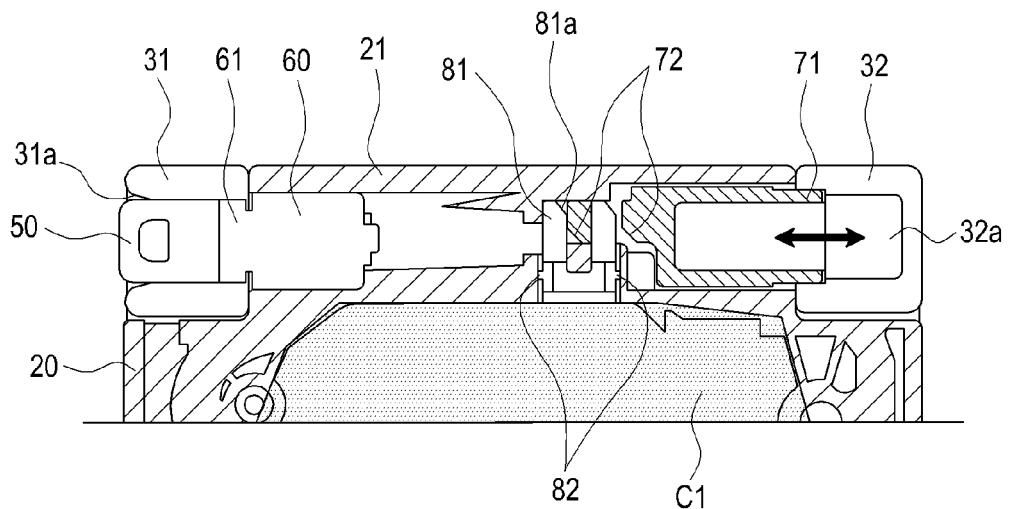
FIG. 7 is a side cross-sectional view showing an after-coupling state of a hinge apparatus for a folder-type portable communication device according to an exemplary embodiment of the present invention.
Figure 8:
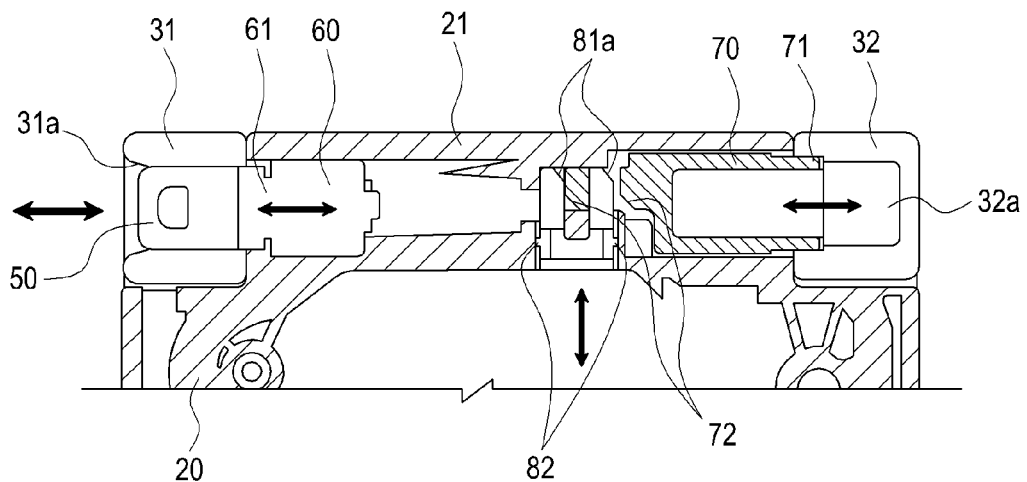
FIG. 8 is a side cross-sectional view showing a separation process of a hinge apparatus for a folder-type portable communication device according to an exemplary embodiment of the present invention.

As shown in FIGS. 7 and 8, the hinge portion 60 is pressed such that the hinge shaft 61 retracts to or protrudes from an inner side of the hinge portion 60.

Figure 6:
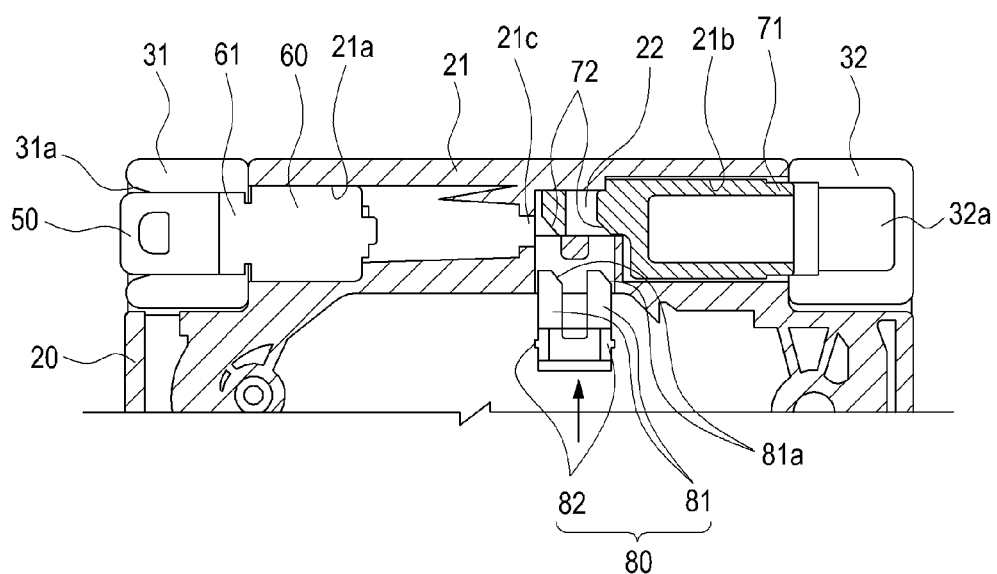
FIG. 6 is a side cross-sectional view showing a coupling process of a hinge apparatus for a folder-type portable communication device according to an exemplary embodiment of the present invention.

As shown in FIGS. 6 through 8, at an end of the hinge dummy 70 is formed the coupling protrusion 71 which protrudes from the moving groove 21b (FIG. 4) of the center hinge arm 21 to be coupled with or separated from the coupling and separating groove 32a of the second side hinge arm 32; at the other end of the hinge dummy 70 is formed an inclined portion 72 which is guide-coupled with a guide coupling portion 81 formed in the hinge bracket portion 80 and moves to the left or right to allow the coupling protrusion 71 to protrude.

As shown in FIGS. 1, 7, and 8, the hinge bracket portion 80 preferably includes the guide coupling portion 81 and a sealing portion 82. The guide coupling portion 81 is inserted into an inserting groove 22 formed in the body portion 20, is guide-coupled with the other end of the hinge dummy 70, and allows the hinge dummy 70 to move to the left or right. The sealing portion 82 is formed in adjacent to the guide coupling portion 81 to seal the inserting groove 22 from an external environment.

As shown in FIGS. 7 and 8, the sealing portion 82 is formed preferably of rubber and may also be formed of other materials than rubber, such as silicon, etc.

As shown in FIGS. 6 through 8, in the guide coupling portion 81 is formed a guide inclined surface 81a which is guide-coupled with the inclined portion 72 and allows for movement of the hinge dummy 70.

Meanwhile, it has been described that the hinge apparatus 10 according to an exemplary embodiment of the present invention is applied to a portable communication device as a representative application example. However, the portable communication device is not limited to a mobile communication terminal and may be various types of terminals or other devices to which the hinge apparatus 10 is applicable, such as a bar-type terminal, a folder-type terminal, a sliding-type terminal, a swing-type terminal, and so forth.

Examples of the portable communication device according to an exemplary embodiment of the present invention may include not only mobile communication terminals operating according to communication protocols corresponding to various communication systems, but also any information communication apparatuses and multimedia apparatuses such as Portable Multimedia Players (PMPs), MP3 players, navigations, game players, notebook computers, advertising boards, TVs, digital broadcasting players, Personal Digital Assistants (PDAs), smart phones, waterproof phones, and so forth, and their application apparatuses, just to name a few examples in which the claimed invention can be applicable.

With reference to FIGS. 1 through 8, a detailed description will now be made of an operating process of the above-described hinge apparatus 10 for the folder-type portable communication device according to an exemplary embodiment of the present invention.

As shown in FIGS. 1 through 8, the hinge apparatus 10 for the folder-type portable communication device may preferably include the body portion 20 having the center hinge arm 21, the folder portion 30 including the first and second side hinge arms 31 and 32, the hinge cap 50, the hinge portion 60, the hinge dummy 70, and the hinge bracket portion 80.

Herein, a waterproof phone will be described as a representative example of the folder-type portable communication device.

As shown in FIGS. 1 through 5, the hinge portion 60 is rested (positioned) in the resting groove 21a formed at a side of the center hinge arm 21. At this time, the hinge shaft 61 of the hinge portion 60 is urged to protrude from the center hinge arm 21. In this protruding state, the hinge dummy 70 is movably coupled with the moving groove 21b formed at the other side of the center hinge arm 21.

Figure 5:
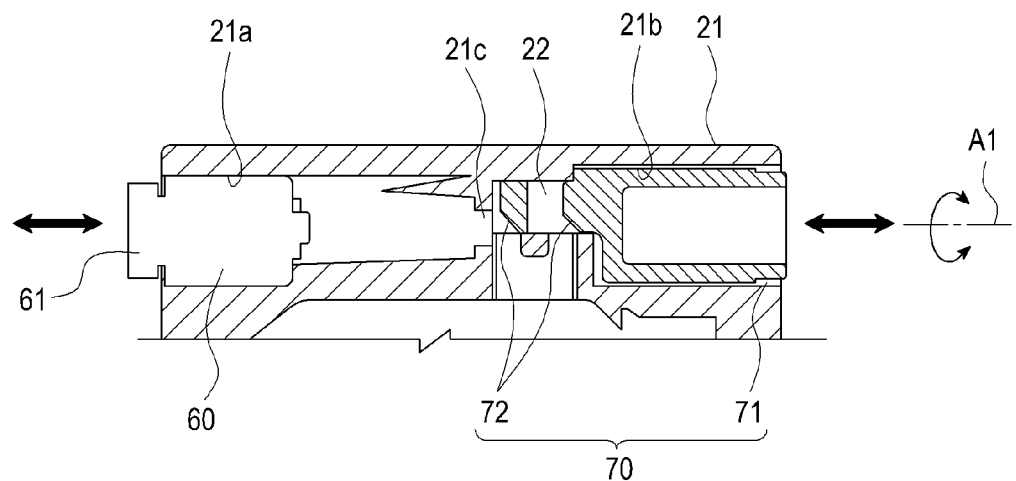
FIG. 5 is a side cross-sectional view showing a state where a hinge portion and a hinge dummy are coupled to a center hinge arm in a hinge apparatus for a folder-type portable communication device according to an exemplary embodiment of the present invention.

As shown in FIGS. 5 and 6, the coupling protrusion 71 of the hinge dummy 70 is coupled so as not to protrude from the hinge portion 60.

In this non-protruding state, as shown in FIGS. 5 through 7, when the folder portion 30 is coupled to the body portion 20 to pivot around the hinge axis A1, the hinge shaft 61 is urged to retract to the inner side of the hinge portion 60, and in this state, the first side hinge arm 31 of the folder portion 30 is coupled with the hinge shaft 61.

At this time, as shown in FIG. 5, when the coupling hole 31a of the first side hinge arm 31 and the hinge shaft 61 correspond to each other, the hinge shaft 61 protrudes from the hinge portion 60 and thus is coupled with the coupling hole 31a.

In this state, as shown in FIG. 6, the hinge cap 50 is coupled to the coupling hole 31a. At this time, the second side hinge arm 32 of the folder portion 30 corresponds to the hinge dummy 70 provided at the other side of the center hinge arm 21.

As shown in FIGS. 6 and 7, the hinge bracket portion 80 is inserted (arranged) into the inserting groove 22 of the body portion 20, and the guide coupling portion 81 of the hinge bracket portion 80 is inserted into the inserting groove 22 and contacts the inclined portion 72 of the hinge dummy 70.

At this time, as shown in FIG. 7, the guide inclined surface 81a formed on the guide coupling portion 81 contacts and pushes the inclined portion 72, such that the inclined portion 72 guide-moves from the left to the right along the hinge axis A1.

As shown in FIG. 7, as the inclined portion 72 guide-moves, the hinge dummy 70 also moves from the left to the right along the hinge axis A1 and the coupling protrusion 71 of the hinge dummy 70 also moves. At this time, the coupling protrusion 71 of the hinge dummy 70 protrudes from the moving groove 21b of the center hinge arm 21 and is coupled to the coupling and separating groove 32a of the second side hinge arm 32.

Herein, the sealing portion 82 formed in the hinge bracket portion 80 is inserted into the inserting groove 22 and seals the inserting groove 22. Thus, an internal region C1 of the body portion 20 is sealed by the sealing portion 82.

The inserting groove 22 of the body portion 20 is sealed by the sealing portion 82 of the hinge bracket portion 80, and the blocking portion 21c preferably for blocking the body portion 20 from an external environment is formed between the resting groove 21a and the moving groove 21b of the center hinge arm 21, such that any opening of the body portion 20 is sealed and thus the folder-type portable communication device can be used as a waterproof phone.

As shown in FIG. 8, in order to separate the folder portion 30 from the body portion 20, when the hinge cap 50 provided in the coupling hole 31a of the first side hinge arm 31 is pushed to the inner side of the coupling hole 31a by an external force, the hinge shaft 61 is pressed together with the hinge cap 50 and thus retracts into the hinge portion 60.

In the state as shown in FIG. 8, when the hinge bracket portion 80 is separated from the inserting groove 22, the hinge dummy 70 moves from the right to the left (laterally) along the hinge axis A1 and thus the coupling protrusion 71 of the hinge dummy 70 also moves, such that the coupling protrusion 71 is separated from the coupling and separating groove 32a of the second hinge arm 32.

At this time, the first and second side hinge arms 31 and 32 of the folder portion 30 are separated from the center hinge arm 21 of the body portion 20, such that the hinge shaft 61 protrudes again.

Herein, the hinge portion 60 is provided with an elastic member (not shown) for allowing the hinge shaft 61 to retract to or protrude from the hinge portion 60.

As such, the hinge shaft 61 retracts or protrudes by a push of (providing a force against) the hinge cap 50, and the hinge dummy 70 moves to the left or right by coupling or separation of the hinge bracket portion 80, thus coupling or separating the body portion 20 and the folder portion 30, thereby preventing deformation and damage in coupling or separation in a product and thus improving in assembly and disassembly of the product.

The above-described hinge apparatus for the folder-type portable communication device according to the presently claimed invention is not limited to the disclosed exemplary embodiment and drawings, and it will be apparent to those of ordinary skill in the art that various substitutions, modifications, and changes are possible in various types of terminals, such as bar-type terminals, sliding-type terminals, swing-type terminals, waterproof terminals, and so forth.

What is claimed is:

1. A hinge apparatus for a portable communication device comprising:
    a body portion;
    a folder portion coupled to the body portion to pivot around a hinge axis;
    a center hinge arm arranged in the body portion along the hinge axis;
    first and second side hinge arms arranged in the folder portion along the hinge axis;
    a hinge cap slidably arranged in the first side hinge arm so as to move relative to the first side hinge arm parallel to the hinge axis upon being pushed by an external force;
    a hinge portion arranged in the center hinge arm, the hinge portion comprising a hinge shaft which is coupled to and separated from the first side hinge arm by protruding and retracting, respectively, by slidable movement of the hinge cap parallel to the hinge axis;
    a hinge dummy arranged in the center hinge arm and coupled to and separated from the second side hinge arm according to a direction of lateral movement along the hinge axis; and
    a hinge bracket portion arranged in the center hinge arm, said hinge bracket portion movable perpendicular to the hinge axis to couple and uncouple with the hinge dummy to permit the hinge dummy to move laterally.

2. The hinge apparatus of claim 1, wherein the first side hinge arm has a coupling hole therein for coupling to the hinge cap to permit access to the hinge cap to be pushed by an external force, and the second side hinge arm has formed therein a coupling and separating groove for coupling to and separating from a coupling protrusion formed on the hinge dummy.

3. The hinge apparatus of claim 2, wherein a resting groove for resting the hinge portion therein is formed at a first side of the center hinge arm, a moving groove for allowing the hinge dummy to move therethrough is formed at a second side of the center hinge arm, and a blocking portion for blocking the body portion from an external environment is formed between the resting groove and the moving groove.

4. The hinge apparatus of claim 3, wherein the coupling protrusion is formed at a first end of the hinge dummy, said coupling protrusion protrudes from the moving groove of the center hinge arm and is adapted for coupling to and separating from the coupling and separating groove of the second side hinge arm, and wherein said hinge dummy has an inclined portion formed at a second end of the hinge dummy, said inclined portion being guide-coupled with a guide coupling portion in the hinge bracket portion and moves laterally to allow the coupling protrusion to protrude.

5. The hinge apparatus of claim 1, wherein the hinge bracket portion comprises: a guide coupling portion arranged into an inserting groove formed in the body portion and guide-coupled with a second end of the hinge dummy to allow the hinge dummy to move laterally; and a sealing portion formed adjacent to the guide coupling portion to seal the inserting groove.

6. The hinge apparatus of claim 5, wherein the sealing portion comprises rubber.

7. The hinge apparatus of claim 5, wherein a guide inclined surface is formed in the guide coupling portion, and said guide inclined surface is guide-coupled with an inclined portion formed at the second end of the hinge dummy and allows the hinge dummy to move along the hinge axis.

8. The hinge apparatus of claim 5, wherein the hinge dummy is separated from the second side hinge arm and the hinge shaft is separated from the first side hinge arm for assembling and disassembling the body portion from the folder portion.

9. A hinge apparatus for a portable communication device comprising:
   a body portion;
   a folder portion coupled to the body portion to pivot around a hinge axis;
   a hinge cap slidably arranged in the folder portion for lateral movement parallel to the hinge axis upon receiving an external force;
   a hinge portion arranged in the body portion, the hinge portion comprising a hinge shaft which is coupled to and separated from the folder portion by protruding and retracing, respectively, by a push of the hinge cap parallel to the hinge axis;
   a hinge dummy provided in the body portion coupled to and separated from the folder portion according to a direction of lateral movement along the hinge axis; and
   a hinge bracket portion arranged in the body portion, said hinge bracket portion movable perpendicular to the hinge axis to couple and uncouple with the hinge dummy to permit the hinge dummy to move laterally along the hinge axis.

* * * * *